US012810121B2

(12) United States Patent
Akama

(10) Patent No.: US 12,810,121 B2
(45) Date of Patent: Nov. 24, 2026

(54) INFORMATION PROCESSING APPARATUS, INFORMATION PROCESSING METHOD, AND INFORMATION PROCESSING PROGRAM

(71) Applicant: Sony Group Corporation, Tokyo (JP)

(72) Inventor: Taketo Akama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 734 days.

(21) Appl. No.: 18/256,639

(22) PCT Filed: Nov. 18, 2021

(86) PCT No.: PCT/JP2021/042384

§ 371 (c)(1),
(2) Date: Jun. 9, 2023

(87) PCT Pub. No.: WO2022/145145

PCT Pub. Date: Jul. 7, 2022

(65) Prior Publication Data

US 2024/0095500 A1 Mar. 21, 2024

(30) Foreign Application Priority Data

Dec. 28, 2020 (JP) ................................ 2020-219553

(51) Int. Cl.
*G06N 3/0455* (2023.01)
*G10H 1/00* (2006.01)

(52) U.S. Cl.
CPC ......... *G06N 3/0455* (2023.01); *G10H 1/0025* (2013.01)

(58) Field of Classification Search
CPC .................................................... G06N 3/0455
(Continued)

(56) References Cited

U.S. PATENT DOCUMENTS

2017/0140743 A1* 5/2017 Gouyon ............. G06Q 30/0255
2019/0012611 A1* 1/2019 Matsumura ............ G06N 20/00
(Continued)

FOREIGN PATENT DOCUMENTS

CN 111465979 A 7/2020
JP 2002099277 A 4/2002
(Continued)

OTHER PUBLICATIONS

International Search Report and Written Opinion mailed on Feb. 15, 2022, received for PCT Application PCT/JP2021/042384, filed on Nov. 18, 2021, 15 pages including English Translation.
(Continued)

*Primary Examiner* — Muluemebet Gurmu
(74) *Attorney, Agent, or Firm* — XSENSUS LLP

(57) ABSTRACT

An information processing apparatus (1) includes control means (30), data input means (10) for inputting sequence data, a machine learning model (21) that generates new sequence data based on the sequence data input by the data input means (10), and sequence data selecting means (10) for selecting, when new sequence data is generated by the machine learning model (21), target sequence data for changing the sequence data and/or context sequence data for not changing the sequence data. The control means (30) (i) generates new target sequence data that interpolates at least two sequence data already generated by the machine learning model or (ii) generates different new sequence data for the sequence data already generated by the machine learning model.

12 Claims, 11 Drawing Sheets

(58) Field of Classification Search
USPC ........................................................ 706/15
See application file for complete search history.

(56) References Cited

U.S. PATENT DOCUMENTS

| | | | | |
|---|---|---|---|---|
| 2020/0394989 | A1* | 12/2020 | Maezawa | G06N 3/09 |
| 2021/0256959 | A1* | 8/2021 | Daido | G10H 1/14 |
| 2021/0256960 | A1* | 8/2021 | Daido | G10H 7/002 |

FOREIGN PATENT DOCUMENTS

| | | | |
|---|---|---|---|
| WO | 2020/080239 | A1 | 4/2020 |
| WO | WO-2020095950 | A1 | 5/2020 |

OTHER PUBLICATIONS

Chen et al., "Music SketchNet: Controllable Music Generation via Factorized Representations of Pitch and Rhythm", arXiv:2008.01291v1, Available Online at: https://arxiv.org/abs/2008.01291v1, Aug. 4, 2020, 16 pages.

Nakamura et al., "A Symbol-level Melody Completion Based on a Convolutional Neural Network With Generative Adversarial Learning", Journal of Information Processing, Available Online at: https://www.jstage.jst.go.j,p/ article/ ipsjjip/28/0/28_248/_pdf, vol. 28, Apr. 2020, pp. 248-257.

Roberts et al., "A Hierarchical Latent Vector Model for Learning Long-Term Structure in Music", arXiv:1803.05428v5, Available Online at: https://arxiv.org/abs/1803.05428v5, Nov. 11, 2019, 19 pages.

Uemura et al., "Preliminary Study on Morphing of Chord Progression", In: Proceedings of the 3rd Conference on Computer Simulation of Musical Creativity (CSMC), Available Online at: https://csmc2018.wordpress.com/proceedings/ and http://galapagos.ucd.ie/wiki/pub/OpenAccess/CSMC/Uemura.pdf, 2018, 15 pages.

Nakamura et al., "Study on melody completion based on convolutional neural networks and adversarial learning", IPSJ SIG Technical Report, Available Online at: http://id.nii.ac.jp/1001/00190775/, vol. 2018-MUS-120, No. 12, Aug. 14, 2018, 9 pages.

Uemura et al., "Preliminary Study on Morphing of Chord Progression", IPSJ SIG Technical Report, Available Online at: http://id.nii.ac.jp/1001/00189860/, vol. 2018-SLP-122, No. 20, Jun. 16, 2018, 10 pages.

Sasaki et al., "Study on melody editing method by automatic interpolation of melody", IPSJ SIG Technical Report, Available Online at: http://id.nii.ac.jp/1001/00189803/, vol. 2018-MUS-119, No. 24, Jul. 16, 2018, 10 pages.

Gaetan Hadjeres et al: "Vector Quantized Contrastive Predictive Coding for Template-based Music Generation", arxiv.org, Cornell University Library, 201 Olin Library Cornell University Ithaca, NY 14853, Apr. 21, 2020 (Apr. 21, 2020), XP081649526.

* cited by examiner

<ON, W, 60>, <SHIFT, 1>, <ON, W, 64>, <SHIFT,1>, <ON, W, 67>, <SHIFT, 2>, <OFF, W, 60>, <OFF, W, 64>, <OFF, W, 67>, <SHIFT, 1>, <ON, W, 65>, <SHIFT, 1>, <OFF, W, 65>

NORMAL GENERATION

INFORMATION PROCESSING APPARATUS, INFORMATION PROCESSING METHOD, AND INFORMATION PROCESSING PROGRAM

CROSS-REFERENCE TO RELATED APPLICATIONS

The present application is based on PCT filing PCT/JP2021/042384, filed Nov. 18, 2021, which claims priority to Japanese Application No. 2020-219553, filed Dec. 28, 2020, the entire contents of each are incorporated herein by reference.

FIELD

The present disclosure relates to an information processing apparatus, an information processing method, and an information processing program.

BACKGROUND

Various proposals have been made concerning a learned model for automatically generating contents (hereinafter also referred to as "sequence") that provide a sequence of information such as music. For example, Patent Literature 1 discloses a method of selectively learning a feature value designated by a user such that a sequence is generated in a mode desired by the user.

CITATION LIST

Patent Literature

Patent Literature 1: WO 2020/080239 A

SUMMARY

Technical Problem

In some case, it is desired to generate a sequence in which only a part is generated anew and the remainder is maintained. This point is not specifically studied in Patent Document 1.

An aspect of the present disclosure provides an information processing apparatus, an information processing method, and an information processing program capable of generating a sequence in which only a part is generated anew and the remainder is maintained.

Solution to Problem

An information processing apparatus according to one aspect of the present disclosure includes: control means; data input means for inputting sequence data; a machine learning model that generates new sequence data based on the sequence data input by the data input means; and sequence data selecting means for, when the new sequence data is generated by the machine learning model, selecting target sequence data for changing the sequence data and/or context sequence data for not changing the sequence data, wherein the control means: (i) generates new target sequence data that interpolates at least two sequence data already generated by the machine learning model; or (ii) generates new different sequence data for the sequence data already generated by the machine learning model.

An information processing apparatus according to one aspect of the present disclosure includes a generation unit that generates a sequence including a determined context sequence and a new target sequence using input information and a learned model, the input information being information concerning a sequence in which a part is configured by a target sequence and a remainder is configured by a context sequence and that provides a series of information, wherein when data corresponding to the input information is input, the learned model outputs data corresponding to the new target sequence.

An information processing apparatus according to one aspect of the present disclosure includes: a generation unit that generates a sequence including a determined context sequence and a new target sequence using input information and a learned model, the input information being information concerning a sequence in which a part is configured by a target sequence and a remainder is configured by a context sequence and that provides a series of information; and a user interface that receives the input information and presents a generation result of the generation unit, wherein when data corresponding to the input information is input, the learned model outputs data corresponding to the new target sequence.

An information processing method according to one aspect of the present disclosure includes generating a sequence including a determined context sequence and a new target sequence using input information and a learned model, the input information being information concerning a sequence in which a part is configured by a target sequence and a remainder is configured by a context sequence and that gives a series of information, wherein when data corresponding to the input information is input, the learned model outputs data corresponding to the new target sequence.

An information processing program according to one aspect of the present disclosure causes a computer to execute generating a sequence including a determined context sequence and a new target sequence using input information and a learned model, the input information being information concerning a sequence in which a part is configured by a target sequence and a remainder is configured by a context sequence and that gives a series of information, wherein when data corresponding to the input information is input, the learned model outputs data corresponding to the new target sequence.

DESCRIPTION OF EMBODIMENT

Figure 1:
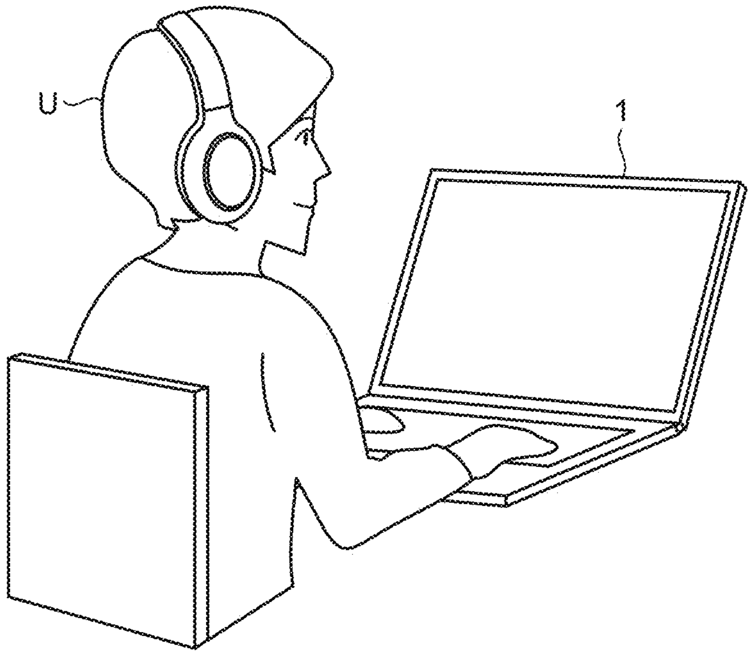
FIG. 1 is a diagram illustrating an example of an exterior of an information processing apparatus according to an embodiment.

An embodiment of the present disclosure is explained in detail below with reference to the drawings. Note that, in the embodiment explained below, redundant explanation is omitted by denoting the same elements with the same reference numerals and signs.

The present disclosure is explained according to order of items described below.

1. Embodiment
2. Example of hardware configuration
3. Example of configuration of RNN
4. Modifications
5. Effects

1. Embodiment

Processing target information of an information processing apparatus according to an embodiment is a sequence (sequence data) that provides a series of information. Examples of the sequence include music (a music sequence, audio, and the like) and language (document, poetry). In the following explanation, a case in which the sequence is a music sequence is mainly explained as an example.

FIG. 1 is a diagram illustrating an example of an exterior of the information processing apparatus according to the embodiment. An information processing apparatus 1 is implemented by, for example, causing a general-purpose computer to execute a predetermined program (software). In the example illustrated in FIG. 1, the information processing apparatus 1 is a laptop computer used by a user U. The information processing apparatus 1 includes a user interface (a user interface 10 in FIG. 5 explained below) for exchanging information with the user U. For example, when the information processing apparatus is the illustrated laptop computer, the user interface can include a display, a keyboard, a touchpad, a speaker, and the like. The display may be a touch panel display. The information processing apparatus 1 may be realized not only by the laptop computer but also by various devices such as a tablet terminal and a smartphone.

Figure 2:
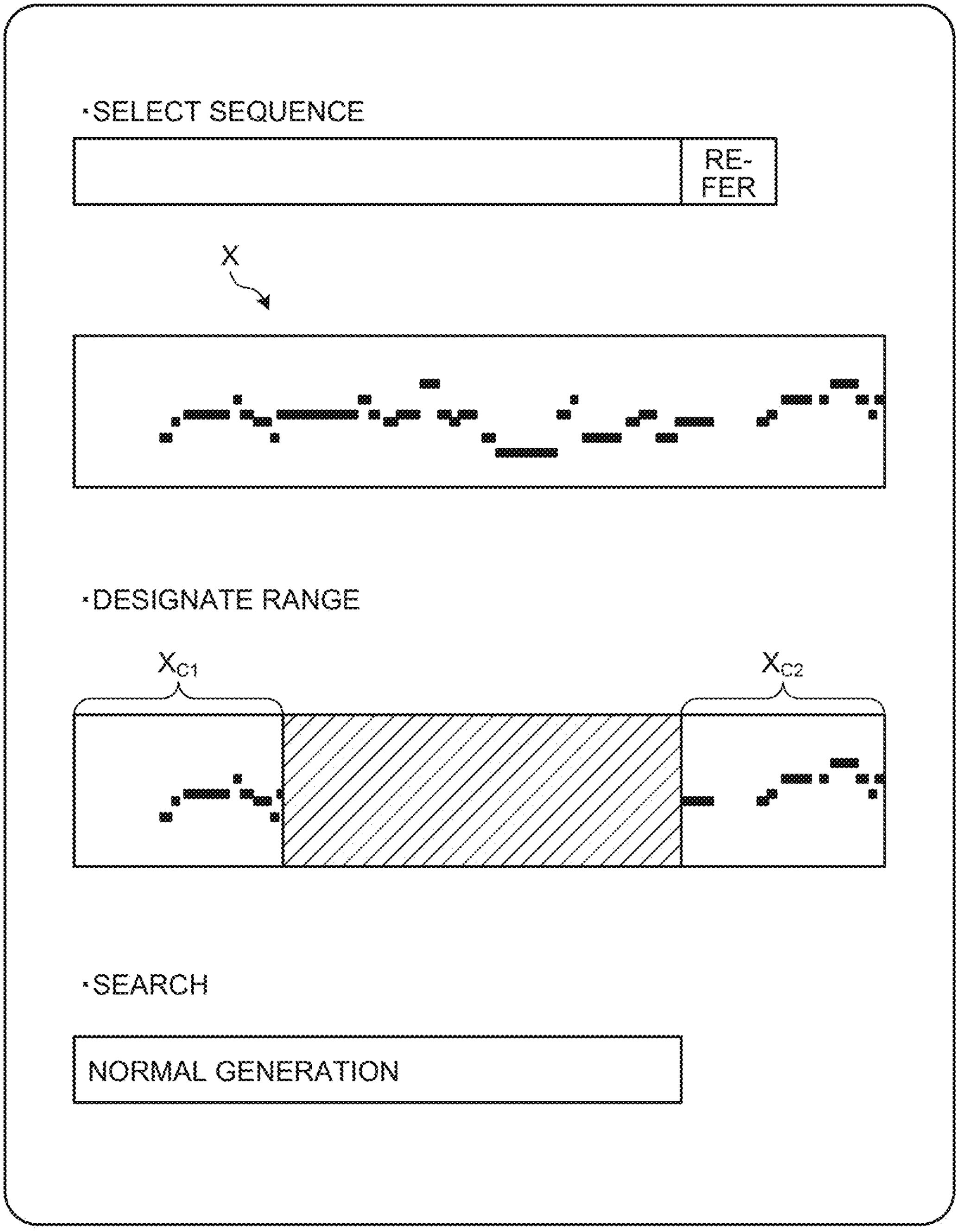
FIG. 2 is a diagram illustrating an example of an operation screen presented by a user interface.
Figure 3:
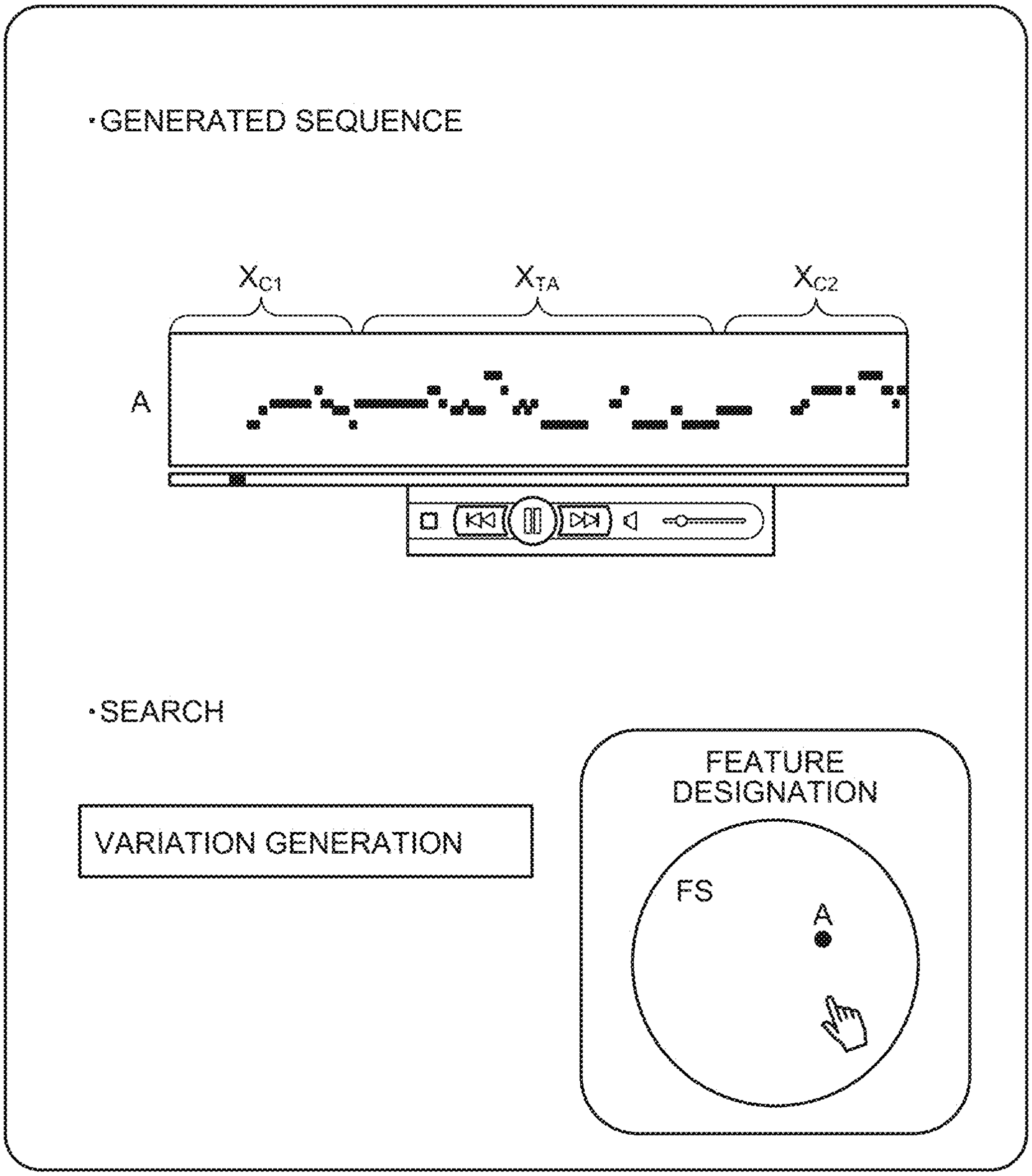
FIG. 3 is a diagram illustrating an example of an operation screen presented by the user interface.
Figure 4:
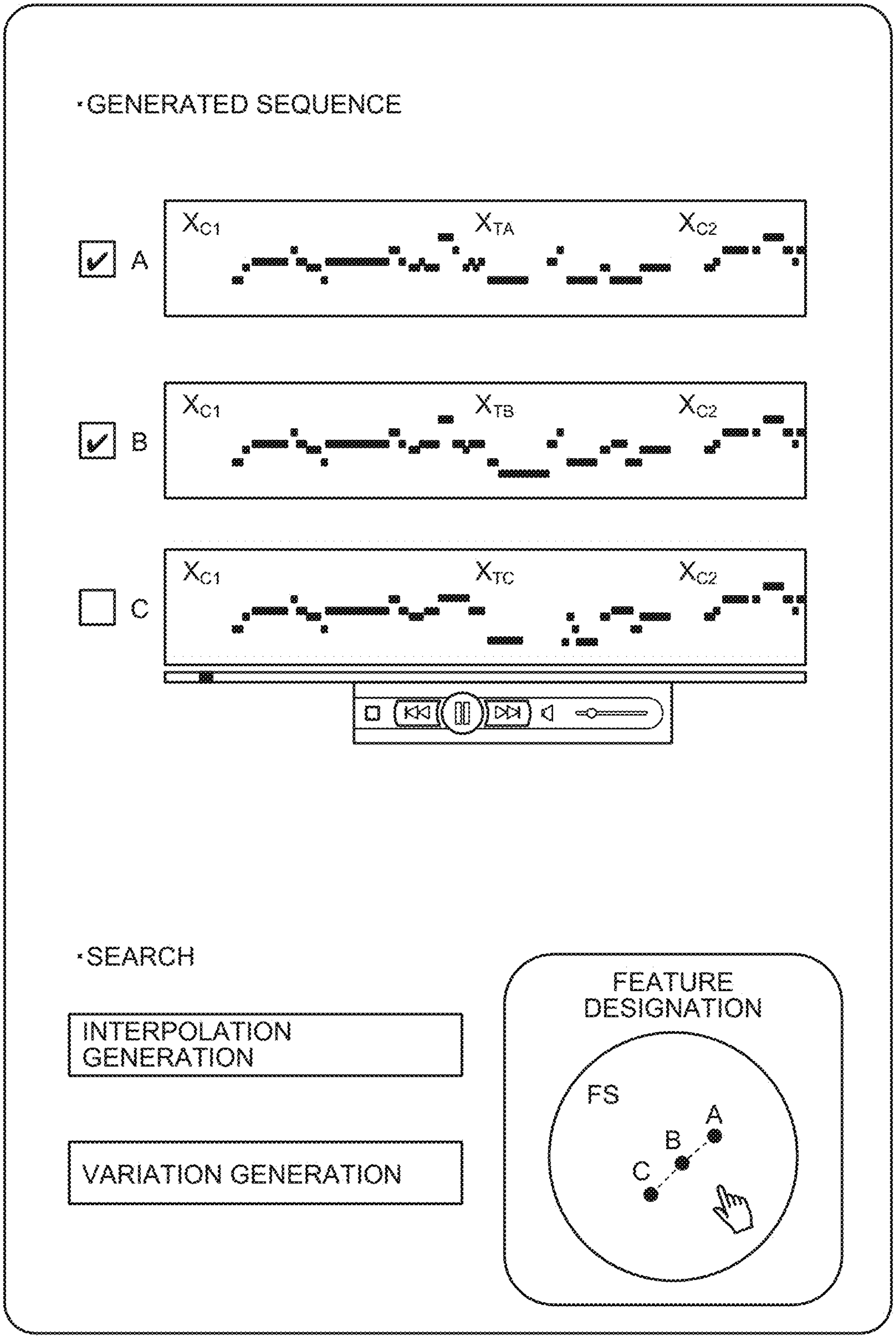
FIG. 4 is a diagram illustrating an example of an operation screen presented by the user interface.

FIGS. 2 to 4 are diagrams illustrating examples of operation screens presented by the user interface. Referring to FIG. 2, in an item "sequence selection", a folder or the like is referred to and a file is selected. A sequence indicated in the selected file is input and visualized and displayed. In this example, a music sequence indicating time and a pitch value in association with each other is displayed as a sequence. The entire sequence is referred to as a sequence x and illustrated. In the following explanation, operation by the user U (user operation) is simply referred to as "operation".

The sequence x is divided into a plurality of sequences by operation relating to an item "range designation". For example, a part of the visualized and displayed sequence x is selected as a range and is divided into a selected portion and the other portion. A part of the divided sequence x is referred to as target sequence (illustrated by hatching) and the remainder is referred to as context sequence $x_c$. The target sequence is a portion requested to be changed (applied with change). The context sequence $x_c$ is a portion requested not to be changed (maintained, not applied with change). Since the context sequence $x_c$ is not changed, it can be said that the context sequence $x_c$ is a determined context sequence $x_c$. By the operation related to the item "range designation", position information (equivalent to position information R in FIG. 8 explained below) of the context sequence $x_c$ in the sequence x is input.

A sequence is generated by operation relating to an item "search". As explained in detail below, when "normal generation" is designated, a sequence is generated based on the context sequence $x_c$ input by the operation related to "sequence selection" explained above and the position information input by the operation relating to "range designation".

Referring to FIG. 3, in an item "generated sequence", a generated sequence A is visualized and displayed in a form in which operation such as reproduction is possible. Compared with the original sequence x (FIG. 2), the sequence A is common in that the sequence A includes the same context sequence $x_c$ but is different in in that the sequence A includes a new target sequence $x_T$. For convenience of explanation, the target sequence $x_T$ of the sequence A is referred to as target sequence $x_{TA}$ and illustrated.

By the operation relating to the item "search", a further sequence is generated based on the sequence A (as a starting point). As explained in detail below, when "variation generation" is designated, a sequence including a target sequence different from the target sequence $x_T$ of the generated sequence is generated. In operation related to "feature designation", a feature of the sequence is designated. In this example, any position (feature) in a latent space FS specifying a feature value of the sequence is designated and a sequence having the feature (a feature value corresponding to the designated position) is generated. This sequence is also a sequence including a target sequence different from the target sequence $x_{TA}$ of the sequence A. For example, via these kinds of operation, a plurality of generated sequences each including a different new target sequence are obtained.

Referring to FIG. 4, in the item "generated sequence", generated sequence B and sequence C are visualized and displayed in a form in which operation such as designation and reproduction can be performed together with the sequence A. The target sequence $x_T$ of the sequence B is referred to as target sequence $x_{TB}$ and illustrated. The target sequence $x_T$ of the sequence C is referred to as target sequence $x_T$c and illustrated. In the following explanation, the sequence A, the sequence B, and the sequence C are sometimes simply referred to as "sequence A and the like".

In the item "search", a further sequence is generated based on the sequence A and the like. As explained in detail below, when "interpolation generation" is designated, a sequence having an intermediate feature between features of the designated sequences (in this example, the sequence A and the sequence B) is generated. The "variation generation" and the "feature designation" are as explained above with reference to FIG. 3. The operation relating to the item "search" is repeated, whereby sequences are generated one after another.

Note that operation of various forms may be presented by the user interface other than the operation screens illustrated in FIG. 2 to FIG. 4 explained above.

Figure 5:
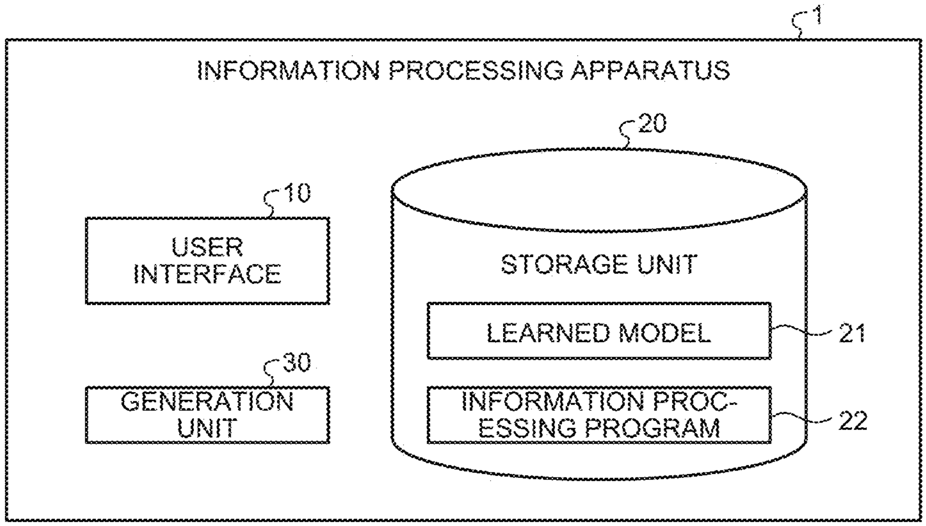
FIG. 5 is a diagram illustrating an example of a schematic configuration of an information processing apparatus.

FIG. 5 is a diagram illustrating an example of a schematic configuration of the information processing apparatus. The information processing apparatus 1 includes a storage unit 20 and a generation unit 30 in addition to the user interface 10 explained above with reference to FIG. 1.

The user interface 10 has a function of an input unit (a reception unit) that receives information according to user operation. It can also be said that the user interface 10 has a function of data input means for inputting sequence data. For example, as explained above with reference to FIG. 2, it can also be said that the user interface 10 also has a function of sequence data selecting means for selecting a target sequence (target sequence data) and/or a context sequence (context sequence data). Information received by the user interface 10 is referred to as "input information". Several examples of the input information are explained.

The input information includes information concerning a sequence. The information concerning the sequence is information concerning a sequence including a determined context sequence $x_c$. Examples of such input information are the information concerning the sequence x explained above with reference to FIG. 2 and the information concerning the generated sequence (the sequence A and the like) explained above with reference to FIG. 3 and FIG. 4. Note that the generated sequence is a sequence generated by the generation unit 30 explained below.

The input information may include information for designating at least one sequence among a plurality of generated sequences. An example of such input information is information for designating the sequence A and the like explained above with reference to FIG. 4. The input information may be, for example, information for designating two sequences of the sequence A and the sequence B.

The input information may include information for designating a feature of the sequence. An example of such input information is information for designating a position (a feature of the sequence) in the latent space FS described above with reference to FIGS. 3 and 4.

The user interface 10 has a function of an output unit (a presentation unit) that presents information to the user. The user interface 10 outputs a generation result of the generation unit 30 explained below. For example, the sequence A and the like are presented (screen display, sound output, or the like) in the form explained above with reference to FIGS. 3 and 4. A feature of the sequence A and the like is presented as a position of the latent space FS. It can be said that the user interface 10 has a function of display means for displaying a position in the latent space FS in a designation enabled form.

The storage unit 20 stores various kinds of information used in the information processing apparatus 1. As an example of the information stored in the storage unit 20, a learned model 21 and an information processing program 22 are illustrated.

The learned model 21 is a learned model generated (learned) using learning data to output data corresponding to a new target sequence $x_T$ when data corresponding to the input information explained above is input. It can also be said that the learned model 21 is a machine learning model for generating new sequence databased on the input sequence data. The generation unit 30 generates, from the input information, data corresponding to the input information and inputs the data to the learned model 21. The generation unit 30 generates, from the data output by the learned model 21, a sequence corresponding to the data output by the learned model 21. The input/output data of the learned model 21 includes, for example, a sequence of tokens (a token sequence). In this case, the data input to the learned model 21 includes a token of the context sequence $x_c$. The data output by the learned model 21 includes a token of the new target sequence $x_T$. The token is explained with reference to FIG. 6.

Figure 6:
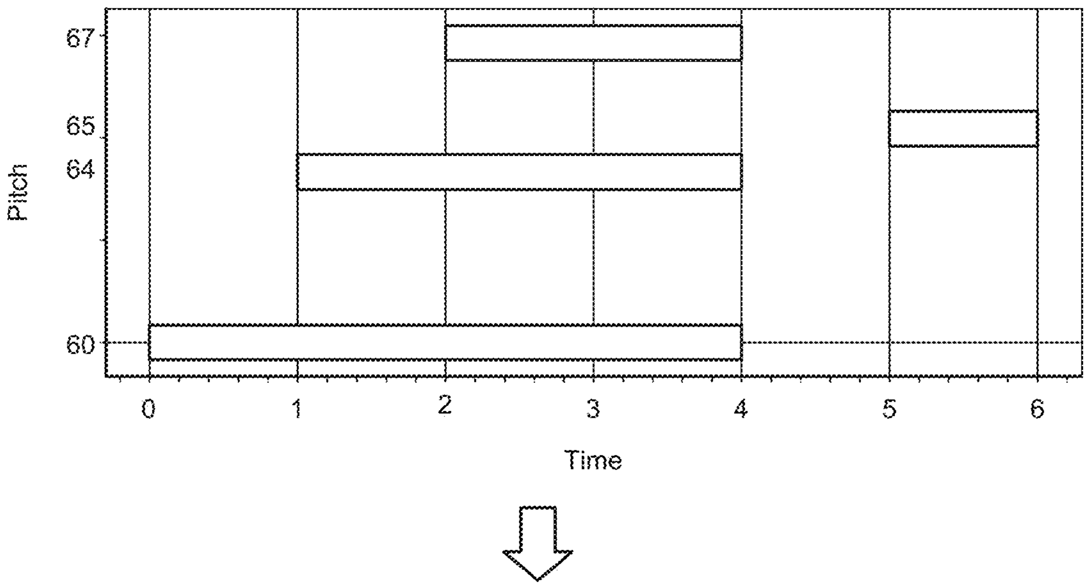
FIG. 6 is a diagram illustrating an example of a token.

FIG. 6 is a diagram illustrating an example of a token. On the upper side of the figure, a music sequence is illustrated as an example of a sequence. The horizontal axis indicates time and the vertical axis indicates a pitch value (MIDI pitch). One unit time corresponds to one bar period. That is, in this example, a series of information given by the sequence is music information indicating a pitch value of sound for each time.

On the lower side of the figure, a token sequence corresponding to the music sequence is illustrated. In this example, the token indicates either a pitch value of sound or a duration of the sound. In the token sequence, a first token and a second token are arranged in time order. The first token is a token indicating generation and stop of each kind of sound included in the sequence. The second token is a token indicating a period in which a state indicated by the first token corresponding to the second token is maintained. A portion represented by angle brackets < > corresponds to one token.

For example, a token <ON, W, 60> is a token (the first token) indicating that generation of sound at a pitch value 60 of a sound source W (for example, indicating a type of a musical instrument) starts at time 0. The following token <SHIFT, 1> is a token (the corresponding second token) indicating that a state (the sound source W, the pitch value 60) indicated by the corresponding first token is maintained for one unit time. That is, SHIFT means that only time moves (only time passes) while a state indicated by the immediately preceding token is maintained. Other tokens concerning ON and SHIFT are explained in the same manner. A token <OFF, W, 60> is a token (the first token) indicating that the generation of the sound at the pitch value 60 of the sound source W ends. Other tokens relating to OFF are explained in the same manner. Note that, in this example, an example is explained in which, when a plurality of kinds of sound are present at the same time, tokens are arranged in order from a token corresponding to low sound. Determining the order in this manner makes it easy to learn the learned model 21.

Note that the above is an example of the token of the sequence in the case in which the sequence is music. When the sequence is a language, the token is a word or the like.

Figure 7:
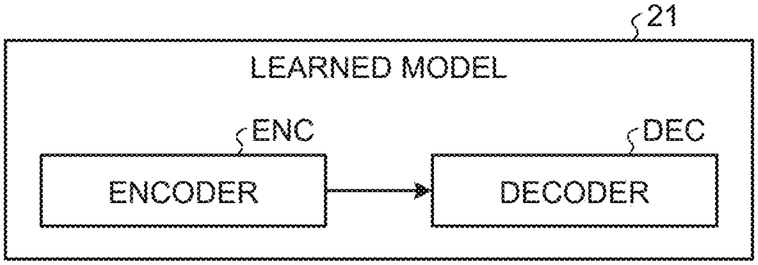
FIG. 7 is a diagram illustrating an example of a schematic configuration of a learned model.

FIG. 7 is a diagram illustrating an example of a schematic configuration of a learned model. In this example, the learned model 21 is a variation autoencoder (VAE) model and includes an encoder ENC and a decoder DEC. Examples of an architecture include a Transformer and an RNN (Recurrent Neural Network). An example of the RNN is an LSTM (Long short-term memory). The encoder ENC outputs (extracts) a feature value of an input sequence of tokens. The decoder DEC generates (reconstructs), from the feature value output by the encoder ENC, using, for example, a sequence of tokens having the highest probability, a sequence of tokens to be output.

Figure 8:
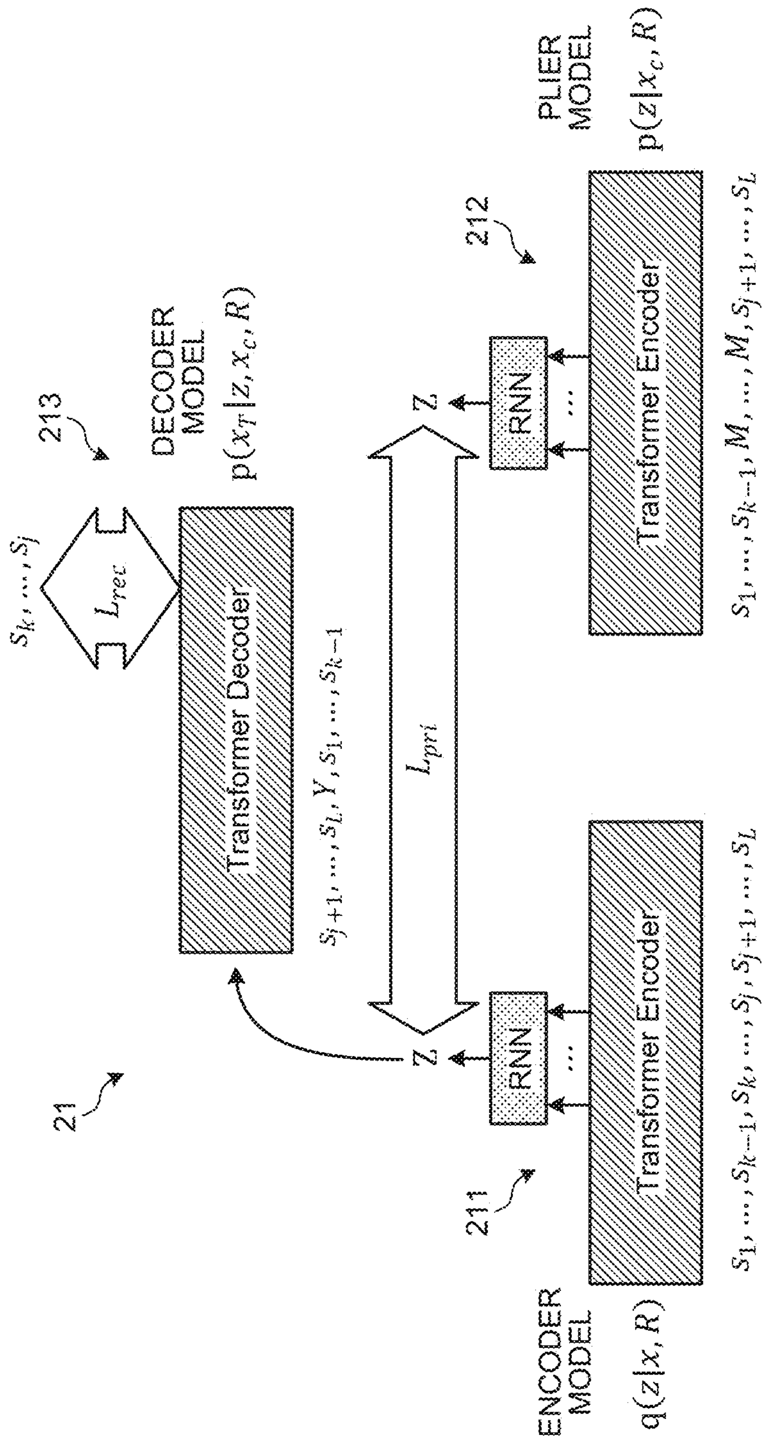
FIG. 8 is a diagram illustrating an example of a schematic configuration of a learned model.

FIG. 8 is a diagram illustrating an example of learning. In a learning stage, three models of an encoder model 211, a plier model 212, and a decoder model 213 are used. Architectures of the encoder model 211 and the plier model 212 are a Transformer and an RNN in this example. An architecture of the decoder model 213 is a Transformer. After the learning, the learned model 21 may include the plier model 212 and the decoder model 213 as the encoder ENC and the decoder DEC in FIG. 7 explained above.

The encoder model 211 gives a feature value z. The feature value z may be a vector indicating a position (a point) in the latent space FS. It can be said that the position in the latent space FS indicates a feature of a sequence. The latent space FS is a multidimensional space and is also referred to as a latent feature space or the like. In the embodiment, it can also be said that the latent space FS is a context latent space learned under a condition (with a context condition) that a determined context sequence $x_c$ is maintained. The latent space FS in FIGS. 3 and 4 explained above is obtained by displaying (for example, two-dimensionally displaying) a part of dimensions of a multi-dimension. The sequence x and the position information R are input to the encoder model 211. The position information R may be a variable j and a variable k explained below.

The sequence x input to the encoder model 211 is illustrated as tokens $s_1, \ldots s_{k-1}, s_k, \ldots, s_j, s_{j+1}, \ldots$, and $s_L$. The subscripts indicate order of tokens in the sequence. Among the subscripts, the variable j and the variable k give the position information R. First to k−1-th tokens $s_1$ to $s_{k-1}$ and j-th to L-th tokens $s_j$ to $s_L$ are specified as positions of the context sequence $x_c$. In other words, k-th to j−1-th tokens $s_k$ to $s_{j-1}$ are specified as positions of the new target sequence $x_T$ to be generated later.

In the encoder model 211, only a token of the context sequence $x_c$ among the tokens, the positions of which are specified as explained above, is input to the RNN. The RNN outputs the feature value z of the input (token of) the context sequence $x_c$. As explained above, since the encoder model 211 outputs the feature value z when the sequence x and the position information R are input, the encoder model 211 is expressed as "q(z|x,R)" and illustrated.

Like the encoder model 211, the plier model 212 also gives the feature value z. The context sequence $x_c$ and the position information R are input to the plier model 212.

The context sequence $x_c$ is illustrated as tokens $s_1, \ldots s_{k-1}$ and tokens $s_{j+1}, \ldots, s_L$. The remaining tokens are given as a predetermined token M. When there are a plurality of remaining tokens, all the tokens may be provided as the same token M. It can also be said that a portion other than the context sequence $x_c$ in the sequence x (a portion of the new target sequence $x_T$ to be generated later) is masked by the token M. The token M may be decided to give a feature value different from all of the feature values z corresponding to tokens that are likely to be input as tokens of the context sequence $x_c$.

The position information R is as explained above. In this example, first to k−1-th tokens $s_1$ to $s_{k-1}$ and j-th to L-th tokens $s_j$ to $s_L$ are specified as positions of the context sequence $x_c$.

In the plier model 212, only the token M among the tokens, the positions of which are specified as explained above, is input to the RNN. The RNN outputs the feature value z of the input token M. As explained above, since the plier model 212 outputs the feature value z when the context sequence $x_c$ and the position information R are input, the plier model 212 is expressed as "p(z|$x_c$,R)" and illustrated.

The decoder model 213 generates a token of the new target sequence $x_T$ based on the feature value z and the token of the context sequence $x_c$. Specifically, the decoder model 213 reconfigures only the token of the target sequence $x_T$ of the context sequence $x_c$ and the target sequence $x_T$. The reconfigured token of the target sequence $x_T$ and the original determined token of the context sequence $x_c$ are combined by, for example, the generation unit 30 and a sequence including the context sequence $x_c$ and the new target sequence $x_T$ is generated. As explained above, when the feature value z, the context sequence $x_c$, and the position information R are input, the decoder model 213 outputs a sequence in which only the target sequence $x_T$ is reconfigured. Therefore, the decoder model 213 is expressed as "p($x_T$|z,$x_c$,R)" and illustrated.

Note that, in the example illustrated in FIG. 8, the decoder model 213 generates the tokens $s_k, \ldots$, and $s_j$ while referring to the tokens $s_{j+1}, \ldots, s_L$, B, $s_1, \ldots$, and $s_{k-1}$. In the tokens $s_{j+1}, \ldots, s_L$, B, $s_1, \ldots$, and $s_{k-1}$, the tokens $s_{j+1}, \ldots$, and $s_L$ and the tokens $s_1, \ldots, s_{k-1}$ are disposed oppositely to the original positions across a token Y (the token indicating the start of the sequence). Since the token $s_k$ is disposed behind the token $s_{k-1}$ by generating the tokens according to such order, it is easy to perform modeling. If the token $s_{j+1}$ is disposed behind, a problem in that the token $s_{j+1}$ cannot be referred to when the token $s_k$ is generated could occur. However, when the token $s_{j+1}$ is disposed ahead, such a problem is also solved. If the token Y is absent, for example, in a case of k=1, a token behind the token Y is absent and a deficiency that the token $s_k$ needs to be generated based on the token $s_L$ occurs. However, since the token Y is present, such a problem is also solved.

The encoder model 211, the plier model 212, and the decoder model 213 explained above are learned to minimize a loss function. In this example, a loss function $L_{rec}$ and a loss function $L_{pri}$ are used as the loss function. The parameters of the encoder model 211, the plier model 212, and the decoder model 213 are learned to minimize a total (an addition value or the like) of the loss function $L_{rec}$ and the loss function $L_{pri}$. The loss function $L_{rec}$ is an error (a reconfiguration error) at the time when the decoder model 213 reconfigures a target sequence using the feature value z output by the plier model 212. The loss function $L_{pri}$ is a difference (a plier error) in distribution between the encoder model 211 and the plier model 212. An example of the plier error is a Kullback-Leibler (KL) distance.

Figure 9:
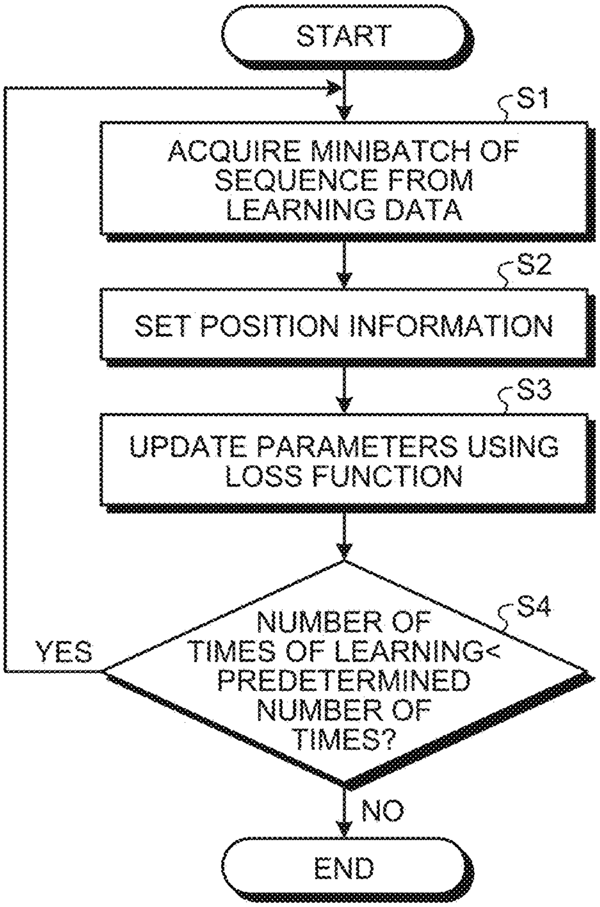
FIG. 9 is a flowchart illustrating an example of learning.

FIG. 9 is a flowchart illustrating an example of learning. As a premise, it is assumed that learning data including a large number of various sequences x is prepared.

In step S1, a mini-batch of a sequence is acquired from the learning data. For example, any predetermined number (sixty-four or the like) of sequences x are acquired (sampled) from the learning data.

In step S2, position information is set. For example, the position information R explained above with reference to FIG. 8, more specifically, the values of j and k are set (sampled) to any values.

In step S3, parameters are updated using the loss function. For example, as explained above with reference to FIG. 8, parameters of the encoder model 211, the plier model 212, and the decoder model 213 are updated (learned) to minimize the total of the loss function $L_{rec}$ and the loss function $L_{pri}$ using the mini-batch acquired and set in the preceding step S1 and step S2.

The learning in step S1 to step S3 explained above is repeatedly executed a predetermined number of times. That is, as depicted in step S4, when the number of times of learning is less than the predetermined number of times (step S4: YES), the processing is returned to step S1. When the number of times of learning reaches the predetermined number of times (step S4: NO), the processing of the flowchart ends.

For example, the learned model 21 is generated as explained above. Note that parameter update may be performed by setting different position information for the same mini-batch. In that case, the processing in step S2 and step S3 may be repeatedly executed by the number of patterns of the position information R to be set.

Returning back to FIG. 5, the information processing program 22 is a program (software) for realizing processing executed in the information processing apparatus 1.

The generation unit 30 generates a sequence including the determined context sequence $x_c$ and the new target sequence $x_T$ using the input information input to the user interface 10 and the learned model 21. The sequence to be generated is the generated sequence (the sequence A or the like) explained above with reference to FIG. 3 and FIG. 4. It can also be said that the generation unit 30 is control means for generating a sequence. A function of the control means may be realized by a processor or the like (for example, a CPU 1100 in FIG. 14 explained below). Several examples of a sequence generation method by the generation unit 30 are explained.

Figure 10:
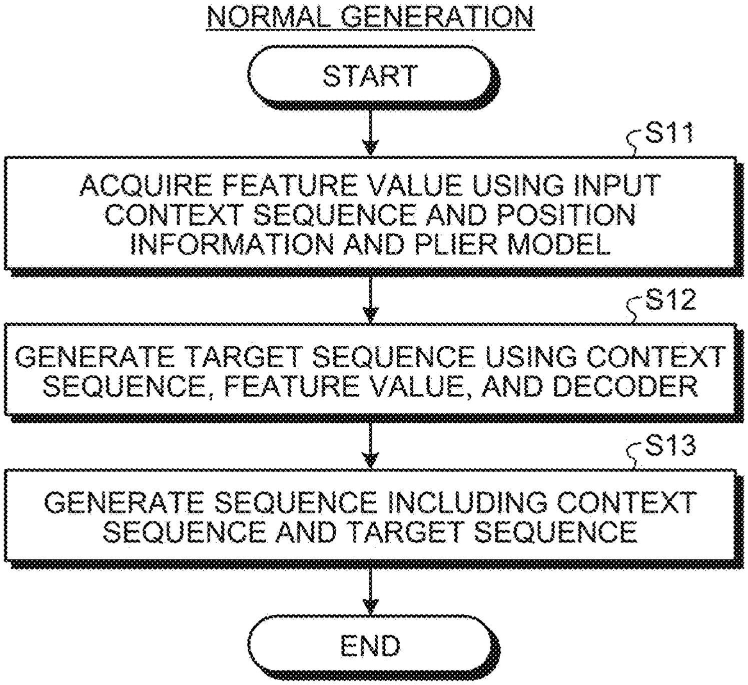
FIG. 10 is a flowchart illustrating an example of processing (an information processing method) executed in the information processing apparatus.
Figure 11:
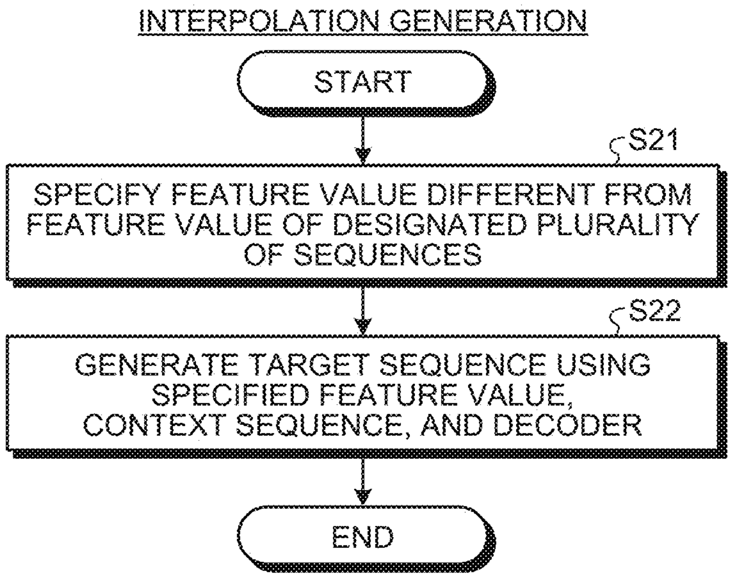
FIG. 11 is a flowchart illustrating an example of processing (the information processing method) executed in the information processing apparatus.
Figure 12:
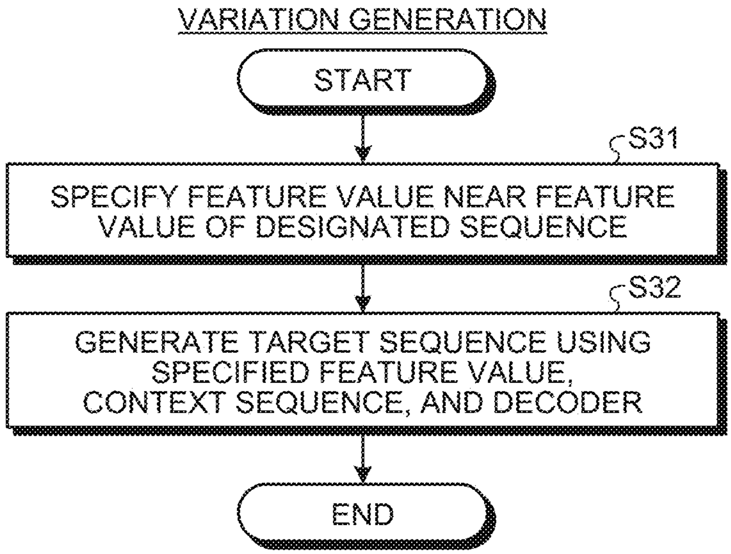
FIG. 12 is a flowchart illustrating an example of processing (the information processing method) executed in the information processing apparatus.

FIG. 10 to FIG. 12 are flowcharts illustrating an example of processing (an information processing method) executed in the information processing apparatus.

FIG. 10 illustrates an example of a first generation method. In the first generation method, the generation unit 30 generates a sequence (for example, at random) using the context sequence $x_c$, the position information R, and the learned model 21. The first generation method is referred to as "normal generation" and illustrated.

In step S11, a feature value is acquired (sampled) using the input context sequence and position information and the plier model. For example, the user interface 10 receives the context sequence $x_c$ and the position information R as input information according to the operation relating to the items "sequence selection" and "range designation" explained above with reference to FIG. 2. As explained above with reference to FIG. 8, the generation unit 30 inputs the sequence including the context sequence $x_c$ and the predetermined token M and the position information R to the plier model 212. The plier model 212 outputs (extracts) the feature value z corresponding to the token M.

In step S12, a target sequence is generated using the context sequence, the feature value, and the decoder. For example, the generation unit 30 inputs, using the learned model 21, the context sequence $x_c$ used in the preceding step S11 and the acquired feature value z to the decoder model 213 as explained above with reference to FIG. 8. The decoder model 213 generates (reconstructs) the target sequence $x_T$.

In step S13, a sequence including the context sequence and the target sequence is generated. For example, the generation unit 30 combines the context sequence $x_c$ used in the preceding step S12 and the generated new target sequence $x_T$ and generates a sequence including the context sequence $x_c$ and the new target sequence $x_T$.

FIG. 11 illustrates an example of a second generation method. In the second generation method, the generation unit 30 generates a sequence including, as a new target sequence, a target sequence different from the target sequence of the generated sequence. For example, the generation unit 30 generates a sequence including, as a new target sequence, a target sequence (complementing two sequence data) having an intermediate feature between features of two designated sequences. The second generation method is referred to as "interpolation generation" and illustrated.

In step S21, a feature value different from feature values of a designated plurality of sequences is specified. For example, the user interface 10 receives, as input information, the information for designating the sequence A and the sequence B and explained above with reference to FIG. 4 and information for designating the "interpolation generation". The generation unit 30 specifies, using the learned model 21, a feature value in a position between a position of a feature value $z_A$ of the sequence A and a position of a feature value $z_B$ of the sequence B in the latent space FS as a feature value $z_{AB}$. Since the learned model 21 learns the latent space FS, it is possible to specify such a feature value $z_{AB}$.

The feature value $z_{AB}$ may be specified after weighting the feature value $z_A$ and the feature value $z_B$. For example, the feature value $z_{AB}$ may be calculated as $z_{AB}=(1-\alpha)Z_A+\alpha Z_B$. $\alpha$ indicates a ratio (a blend ratio) of the feature value $z_A$ and the feature value $z_B$ in the feature value $z_{AB}$. In this example, $(1-\alpha)$ indicates a ratio of the feature value $z_A$ and $\alpha$ indicates a ratio of the feature value $z_B$. For example, in a case of $\alpha=0.25$, a feature value obtained by combining (blending) the feature value $z_A$ and the feature value $z_B$ at 0.75:0.25 is specified as the feature value $z_{AB}$. For example, the user interface 10 may provide display or the like with which the user can designate $\alpha$.

In step S22, a target sequence is generated using the specified feature value, the context sequence, and the decoder. For example, the generation unit 30 inputs, using the learned model 21, the feature value $z_{AB}$ specified in the preceding step S21 to the decoder model 213. The decoder model 213 generates a target sequence $x_{TAB}$ corresponding to the feature value $z_{AB}$. The target sequence $x_{TAB}$ and the context sequence $x_c$ obtained in this way are combined and a new sequence AB is generated.

FIG. 12 illustrates an example of a third generation method. In the third generation method as well, the generation unit 30 generates a sequence including, as a new target sequence, a target sequence different from (different with respect to) the target sequence of the generated sequence. In the third generation method, only one designated sequence is sufficient. The third generation method is referred to as "variation generation" and illustrated.

In step S31, a feature value near the feature value of the designated sequence is specified. For example, the user interface 10 receives, as input information, the information for designating the sequence A and the information for designating the "variation generation" in the example in FIG. 3 or FIG. 4 explained above. The generation unit 30 specifies, using the learned model 21, a feature value $z_A'$ in a position obtained by slightly moving the position of the feature value $z_A$ of the sequence A in the latent space FS. The movement is performed, for example, by adding noise to the feature value $z_A$. The noise may be sampled from normal distributions in dimensions of the latent space FS. An average and a variance of the normal distributions may be optionally determined (for example, an average of 0 and a variance of 0.01).

In step S32, a target sequence is generated using the specified feature value, the context sequence, and the decoder. For example, the generation unit 30 inputs, using the learned model 21, the feature value $z_A'$ specified in the preceding step S31 to the decoder model 213. The decoder model 213 generates a target sequence $xT_A'$ corresponding to the feature value $z_A'$. The target sequence $xT_A'$ obtained in this way and the context sequence $x_c$ are combined and a new sequence A' is generated. Note that a plurality of different feature values may be specified in the preceding step S32. In this case, new target sequences and new sequences as many as the number of feature values (the number of variations) are generated. For example, the user interface 10 may provide display or the like with which the user can designate the number of variations.

Note that the sequence on which the variation generation is based and the generated sequence and the sequence on which the interpolation generation is based and the generated sequence sometimes overlap. For example, as explained above, the sequence B is generated by the interpolation generation from the sequence A and the sequence C. The sequence A and the sequence C can be generated by the variation generation from the sequence B.

Besides the normal generation, the interpolation generation, and the variation generation explained above, various generation methods may be used. As a fourth generation method, the generation unit 30 may generate a sequence having a designated feature. For example, as explained above with reference to FIGS. 3 and 4, the user interface 10 receives, as the input information, the information for designating the position (the feature of the sequence) in the latent space FS. The generation unit 30 inputs a feature value in the designated position to the decoder model 213. The decoder model 213 generates a target sequence corresponding to the feature value. The context sequence $x_c$ and the target sequence are combined and a new sequence D, a new sequence E, a new sequence F, and the like are generated.

By combining the various generation methods explained above, it is possible to search for a desired sequence. This is explained with reference to FIG. 13.

Figure 13:
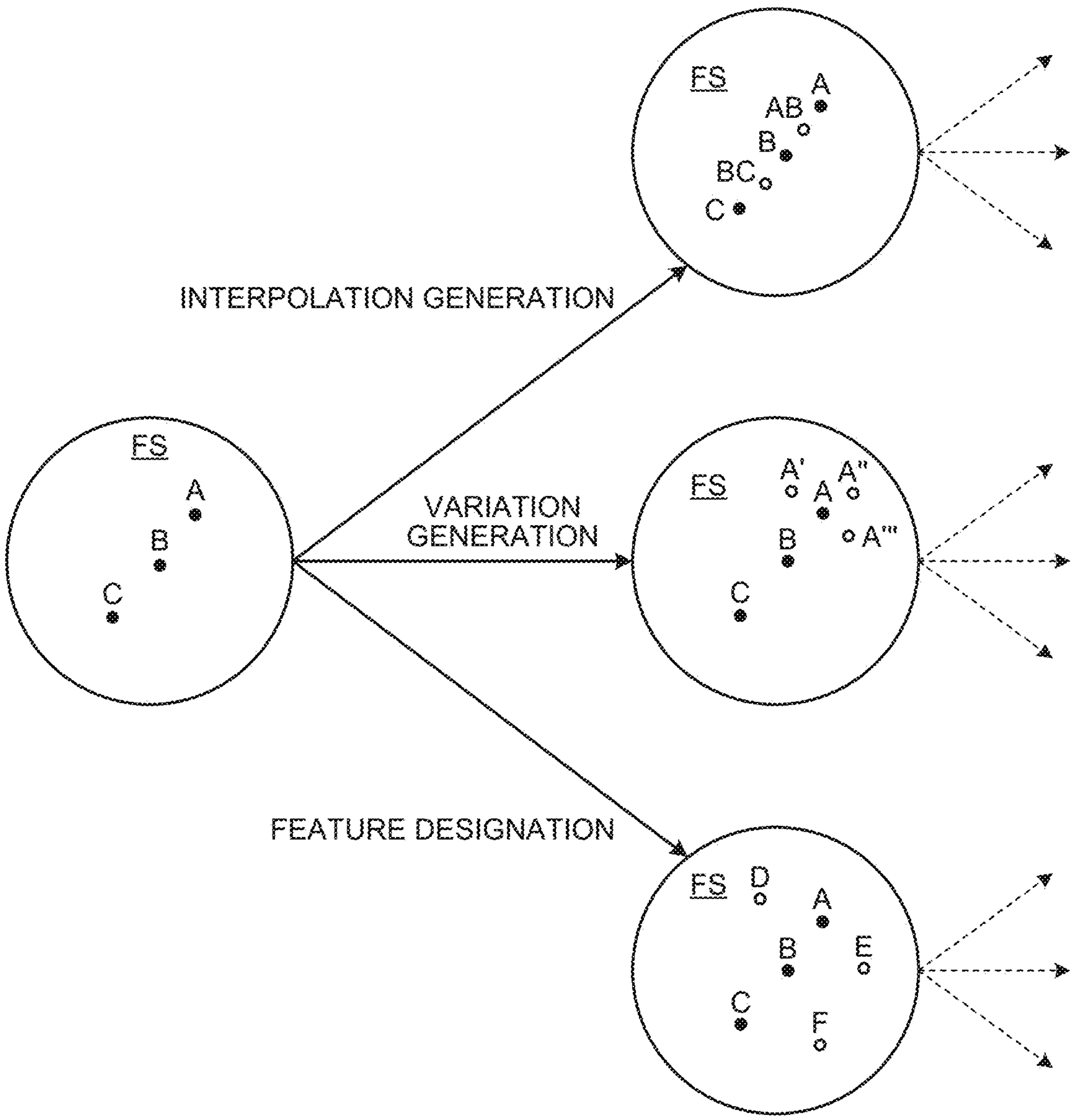
FIG. 13 is a diagram schematically illustrating an example of a sequence search.

FIG. 13 is a diagram schematically illustrating an example of a sequence search. The search is advanced from the left side to the right side of the figure. As a premise, it is assumed that the sequence A and the like have been obtained by, for example, the various generation methods explained above. The positions of the sequence A and the like in the latent space FS are schematically illustrated.

A further sequence search is performed based on the sequence A and the like (as a starting point). For example, as illustrated in an upper part of the figure, the interpolation generation may be performed. In this example, a sequence AB (illustrated by a white circle) having an intermediate feature between features of the sequence A and the sequence B and a sequence BC (illustrated by a white circle) having an intermediate feature between features of the sequence B and the sequence C are generated. From the generated sequence AB, the generated sequence BC, and the like, a further sequence may be generated by interpolation generation, variation generation, feature designation, and the like.

Alternatively, variation generation may be performed as illustrated in a middle part of the figure. In this example, a sequence A', a sequence A'', and a sequence A''' (all of which are illustrated by white circles) having a feature obtained by adding noise to a feature of the sequence A are generated. From the generated sequence A', the generated sequence A'', the generated sequence A''', and the like, a further sequence may be generated by the interpolation generation, the variation generation, the feature designation, and the like.

Alternatively, as illustrated in a lower part of the figure, the feature designation may be performed. In this example, a sequence D, a sequence E, and a sequence F (all of which are illustrated by white circles) having designated features are generated. From the generated sequence D, the generated sequence E, the generated sequence F, and the like, a further sequence may be generated by the interpolation generation, the variation generation, the feature designation, and the like.

For example, as explained above, the user U can repeat the generation of a sequence until obtaining a desired sequence.

As explained above, with the information processing apparatus 1, it is possible to generate a sequence by combining various generation methods. Therefore, it is possible to provide sequence generation excellent in operability. The user U can narrow down sequences to be able to obtain a desired target sequence. For example, the user U can generate a sequence A to a sequence G including different target sequences and further generate, with the interpolation generation, a sequence obtained by blending favorite sequences B and F among the sequences A to G. The user U can improve a favorite target sequence while finely correcting the target sequence. For example, the user U can generate, with the variation generation, a sequence similar to the sequence A but slightly different from the sequence A (for example, the sequence B to the sequence E). The user U can blend, with the interpolation generation, among the generated sequences, a sequence close to an image (for example, the sequence C and the sequence E) to generate a further sequence.

2. Example of Hardware Configuration

Figure 14:
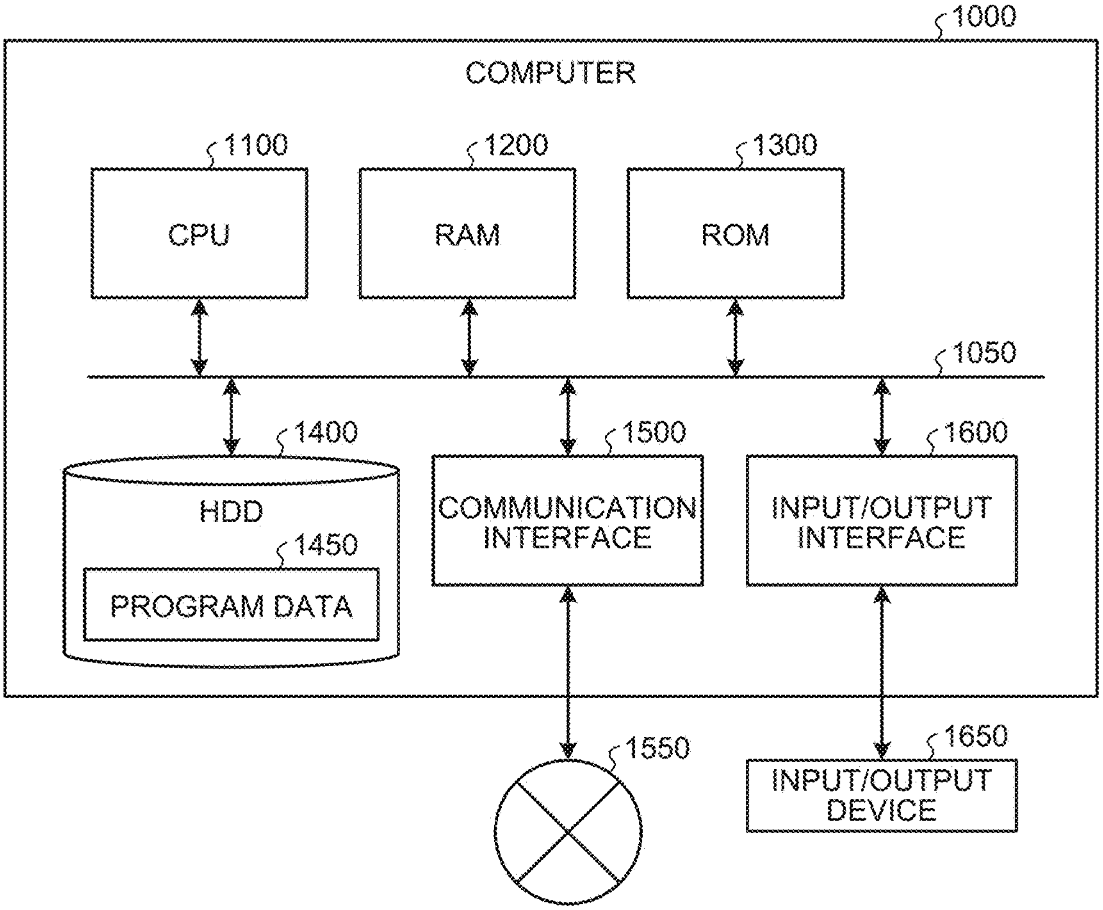
FIG. 14 is a diagram illustrating an example of a hardware configuration of the information processing apparatus.

FIG. 14 is a diagram illustrating an example of a hardware configuration of the information processing apparatus. In this example, the information processing apparatus 1 is realized by the computer 1000. The computer 1000 includes a CPU 1100, a RAM 1200, a ROM (Read Only Memory) 1300, an HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 develops the programs stored in the ROM 1300 or the HDD 1400 in the RAM 1200 and executes processing corresponding to various programs.

The ROM 1300 stores a boot program such as a BIOS (Basic Input Output System) executed by the CPU 1100 at a start time of the computer 1000, a program depending on hardware of the computer 1000, and the like.

The HDD 1400 is a computer-readable recording medium that non-transiently records a program to be executed by the CPU 1100, data to be used by such a program, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is an interface for connecting an input/output device 1650 and the computer 1000. For example, the CPU 1100 receives data from an input device such as a keyboard or mouse via the input/output interface 1600. Further, the CPU 1100 transmits data to an output device such as a display, a speaker, or a printer via the input/output interface 1600. The input/output interface 1600 may function as a media interface that reads a program or the like recorded in a predetermined recording medium (a medium). The medium is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

For example, when the computer 1000 functions as the information processing apparatus 1, the CPU 1100 of the computer 1000 executes an information processing program loaded on the RAM 1200 to thereby realize the functions of the generation unit 30 and the like. The HDD 1400 stores a program according to the present disclosure (the information processing program 22 in the storage unit 20) and data in the storage unit 20. Note that the CPU 1100 reads the program data 1450 from the HDD 1400 and executes the program data. However, as another example, the CPU 1100 may acquire these programs from another device via the external network 1550.

3. Example of Configuration of RNN

Figure 15:
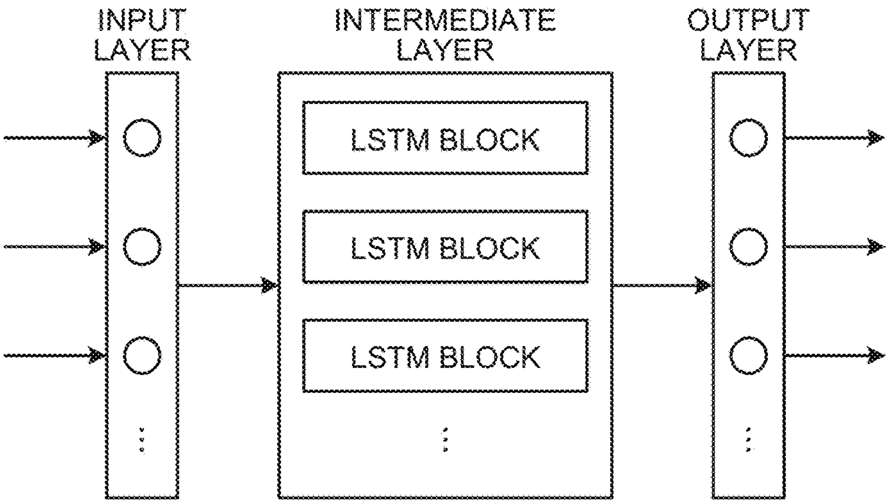
FIG. 15 is a diagram illustrating an example of a schematic configuration of an RNN.

FIG. 15 is a diagram illustrating an example of a schematic configuration of an RNN. The illustrated RNN includes an input layer, an intermediate layer, and an output layer. Several neurons included in the layers are schematically illustrated by white circles. For example, the token and the like explained above with reference to FIG. 5 and the like are input to the input layer. In this example, the intermediate layer includes an LSTM block. Long-term dependencies are learned in the intermediate layer. The intermediate layer is suitable for handling a sequence (for example, time-series data) of music, documents, and the like. The output layer is a fully connected layer and outputs, together with a probability, for example, the token explained above with reference to FIG. 5 and the like.

4. Modifications

The disclosed technique is not limited to the embodiment explained above. Several modifications are explained.

In the embodiment explained above, an example in which the sequence x is divided into one target sequence and two context sequences (a context sequence xci and a context sequence $x_{c2}$) in the range designation (FIG. 1) is explained (FIG. 1). However, a range may be designated such that the sequence x is divided into one target sequence and one context sequence.

A part of the functions of the information processing apparatus 1 may be realized outside the information processing apparatus 1 (for example, in an external server). In that case, the information processing apparatus 1 may include, in the external server, a part or all of the functions of the storage unit 20 and the generation unit 30. The information processing apparatus 1 communicates with the external server, whereby the processing of the information processing apparatus 1 explained above is realized in the same manner.

The learned model 21 may also include the encoder model 211 as the encoder ENC. In this case, the learned model 21 can be used for, for example, a use for extracting a feature value from the sequence x also including the target sequence explained with reference to FIG. 1.

5. Effects

The information processing apparatus 1 explained above is specified, for example, as explained below. As explained with reference to FIG. 1 to FIG. 5 and the like, the information processing apparatus 1 includes control means (the generation unit 30), data input means (the user interface 10) for inputting sequence data (the sequence x and the like), a machine learning model (the learned model 21) for generating new sequence data (for example, the sequence A) based on the sequence data (for example, the sequence x) input by the data input means (the user interface 10), and sequence data selecting means (the user interface 10) for selecting target sequence data (for example, the target sequence $x_{TA}$) that changes the sequence data (for example, the sequence A) and/or context sequence data (context sequence $x_c$) that does not change the sequence data when the new sequence data (for example, the sequence A) is generated by the machine learning model (the learned model 21). The control means (the generation unit 30) (i) generates new target sequence data for interpolating at least two sequence data (for example, the sequence A and the sequence B) already generated by the machine learning model (the learned model 21) or (ii) generates new sequence data different with respect to the sequence data (for example, the sequence A) already generated by the machine learning model (the learned model 21).

The information processing apparatus 1 may further include display means (the user interface 10) for displaying, in a designation enabled form, a position in a space (the latent space FS) that defines a feature value of the sequence data (for example, the sequence A) learned by the machine learning model (the learned model 21). The control means (the generation unit 30) may generate sequence data having a feature value corresponding to a designated position in the space (the latent space FS) as new sequence data.

The information processing apparatus 1 is also specified explained below. As explained with reference to FIG. 1 to FIG. 5 and the like, the information processing apparatus 1 includes the generation unit 30 that generates a sequence (for example, the sequence A or the like) including the determined context sequence $x_c$ and the new target sequence $x_T$ using input information, which is information concerning a sequence in which a part is configured by a target sequence and the remainder is configured by a context sequence and that provides a series of information, and the learned model 21. When data corresponding to the input information is input, the learned model 21 outputs data corresponding to the new target sequence $x_T$. The information processing apparatus 1 may include the user interface 10 that receives the input information and presents a generation result of the generation unit 30.

With the information processing apparatus 1 explained above, a sequence including the determined context sequence $x_c$ and the new target sequence $x_T$ is generated. The context sequence $x_c$ configures a part of the sequence and the target sequence $x_T$ configures the remainder of the sequence. Therefore, it is possible to generate a sequence in which only a part is generated anew and the remainder is maintained.

As explained with reference to FIG. 2 and FIG. 8 and the like, the input information (for example, received by the user interface 10) may include the determined context sequence $x_c$ and the position information R of the determined context sequence $x_c$ in the sequence. A sequence including the determined context sequence $x_c$ and the new target sequence $x_T$ can be generated using, for example, such input information and the learned model 21.

As explained with reference to FIGS. 3 and 4 and the like, the input information (for example, received by the user interface 10) includes information concerning the sequence (for example, the sequence A and the like) generated by the generation unit 30. The generation unit 30 may generate a sequence including, as a new target sequence, a sequence different from the target sequence (for example, the target sequence $x_{TA}$ or the like) of the sequence generated by the generation unit 30. Consequently, a sequence can be further generated based on the generated sequence.

As explained with reference to FIGS. 3 and 4 and the like, the input information (for example, received by the user interface 10) includes information for designating at least one sequence among a plurality of sequences (for example, the sequence A and the like) generated by the generation unit 30. The generation unit 30 may generate a sequence including, as a new target sequence, a target sequence different from the target sequence (for example, the target sequence $x_{TA}$ or the like) of the designated sequence. Consequently, a sequence can be further generated based on the designated sequence.

As explained with reference to FIG. 4 and the like, the input information (for example, received by the user interface 10) may include information for designating two sequences (for example, the sequence A and the sequence B) among a plurality of sequences (for example, the sequence A and the like) generated by the generation unit 30. The generation unit 30 may generate a sequence including, as a new target sequence, a target sequence having a feature between features of target sequences (for example, the target sequence $x_{TA}$ and the target sequence $x_{TB}$) of the designated two sequences. Consequently, a sequence having an intermediate feature between features of the designated two sequences can be generated.

As explained with reference to FIGS. 3 and 4 and the like, the input information (for example, received by the user interface 10) may include information for designating a feature (for example, a position in the latent space FS) of the sequence. The generation unit 30 may generate a sequence having the designated feature. Consequently, a sequence having the designated feature can be generated.

As explained with reference to FIG. 6 to FIG. 8 and the like, the data input to the learned model 21 may include tokens (for example, the tokens $s_1, \ldots,$ and $s_{k-1}$ and the tokens $s_{j+1}, \ldots,$ and $s_L$) of the determined context sequence $x_c$. The data output by the learned model 21 may include tokens (for example, the tokens $s_k, \ldots,$ and $s_j$) of the new target sequence $x_T$. The input data may further include the predetermined token M. The series of information given by the sequence may be music information indicating a pitch value of sound for each time. The token may indicate at least one of the pitch value of the sound and a generation period of the sound. For example, the learned model 21 can be used with such tokens as input/output data.

The information processing method explained with reference to FIG. 10 to FIG. 12 and the like is also an aspect of the present disclosure. The information processing method includes generating a sequence including the determined context sequence $x_c$ and the new target sequence $x_T$ using input information, which is information concerning a sequence in which a part is configured by a target sequence and the remainder is configured by a context sequence and that provides a series of information, and the learned model 21 (step S13, step S22 and/or step S32). When data corresponding to the input information is input, the learned model 21 outputs data corresponding to the new target sequence $x_T$. With such an information processing method, as explained above, it is possible to generate a sequence in which only a part is generated anew and the remainder is maintained.

The information processing program 22 explained with reference to FIG. 5 and the like is also an aspect of the present disclosure. The information processing program 22 causes a computer to execute generating a sequence including the determined context sequence $x_c$ and the new target sequence $x_T$ using input information, which is information concerning a sequence in which a part is configured by a target sequence and the remainder is configured by a context sequence and that provides a series of information, and the learned model 21 (step S13, step S22 and/or step S32). When data corresponding to the input information is input, the learned model 21 outputs data corresponding to the new target sequence $x_T$. With such an information processing program 22, as described above, it is possible to generate a sequence in which only a part is newly generated and the remainder is maintained.

The effects described in the present disclosure are only examples and are not limited by the disclosed content. There may be other effects.

Although the embodiment of the present disclosure is explained above, the technical scope of the present disclosure is not limited to the embodiment explained above per se. Various changes are possible without departing from the gist of the present disclosure. Components in different embodiments and modifications may be combined as appropriate.

Note that the present technique can also take the following configurations.

(1) An information processing apparatus comprising: control means;
data input means for inputting sequence data;
a machine learning model that generates new sequence data based on the sequence data input by the data input means; and
sequence data selecting means for, when the new sequence data is generated by the machine learning model, selecting target sequence data for changing the sequence data and/or context sequence data for not changing the sequence data, wherein
the control means:
(i) generates new target sequence data that interpolates at least two sequence data already generated by the machine learning model; or
(ii) generates new different sequence data for the sequence data already generated by the machine learning model.

(2) The information processing apparatus according to (1), further comprising
display means for displaying, in a designation enabled form, a position in a space that defines a feature value of the sequence data learned by the machine learning model, wherein
the control means generates, as the new sequence data, sequence data having a feature value corresponding to a designated position in the space.

(3) An information processing apparatus comprising
a generation unit that generates a sequence including a determined context sequence and a new target sequence using input information and a learned model, the input information being information concerning a sequence in which a part is configured by a target sequence and a remainder is configured by a context sequence and that provides a series of information, wherein
when data corresponding to the input information is input, the learned model outputs data corresponding to the new target sequence.

(4) The information processing apparatus according to (3), wherein
the input information includes:
the determined context sequence; and position information of the determined context sequence in the sequence.

(5) The information processing apparatus according to (3) or (4) wherein the input information includes information concerning the sequence generated by the generation unit, and the generation unit generates a sequence including, as the new target sequence, a target sequence different from the target sequence of the sequence generated by the generation unit.

(6) The information processing apparatus according to any one of (3) to (5), wherein the input information includes information for designating at least one sequence among a plurality of sequences generated by the generation unit, and the generation unit generates a sequence including, as the new target sequence, a target sequence different from a target sequence of the designated sequence.

(7) The information processing apparatus according to any one of (3) to (6), wherein the input information includes information for designating two sequences among a plurality of sequences generated by the generation unit, and the generation unit generates a sequence including, as the new target sequence, a target sequence having a feature between features of target sequences of the designated two sequences.

(8) The information processing apparatus according to any one of (3) to (7), wherein the input information includes information for designating a feature of a sequence, and the generation unit generates a sequence having the designated feature.

(9) The information processing apparatus according to any one of (3) to (8), wherein the data input to the learned model includes a token of the determined context sequence, and the data output by the learned model includes a token of the new target sequence.

(10) The information processing apparatus according to any one of (3) to (9), wherein the data input to the learned model includes a token of the determined context sequence and a predetermined token, and the data output by the learned model includes a token of the new target sequence.

(11) The information processing apparatus according to (9) or (10), wherein a series of information given by the sequence is music information indicating a pitch value of sound for each time, and the token indicates at least one of the pitch value of the sound and a generation period of the sound.

(12) An information processing apparatus comprising:

a generation unit that generates a sequence including a determined context sequence and a new target sequence using input information and a learned model, the input information being information concerning a sequence in which a part is configured by a target sequence and a remainder is configured by a context sequence and that provides a series of information; and a user interface that receives the input information and presents a generation result of the generation unit, wherein when data corresponding to the input information is input, the learned model outputs data corresponding to the new target sequence.

(13) The information processing apparatus according to claim 12, wherein the user interface receives, as the input information, the determined context sequence and position information of the determined context sequence in a sequence.

(14) The information processing apparatus according to (12) or (13), wherein the user interface receives, as the input information, information concerning the sequence generated by the generation unit, and the generation unit generates a sequence including, as the new target sequence, a target sequence different from the target sequence of the sequence generated by the generation unit.

(15) The information processing apparatus according to any one of (12) to (14), wherein the user interface receives, as the input information, information for designating at least one sequence among a plurality of sequences generated by the generation unit, and the generation unit generates a sequence including, as the new target sequence, a target sequence different from a target sequence of the designated sequence.

(16) The information processing apparatus according to any one of (12) to (15), wherein the user interface receives, as the input information, information for designating two sequences among a plurality of sequences generated by the generation unit, and the generation unit generates a sequence including, as the new target sequence, a target sequence having a feature between features of target sequences of the designated two sequences.

(17) The information processing apparatus according to any one of (12) to (16), wherein the user interface receives, as the input information, information for designating a feature of a sequence, and the generation unit generates a sequence having a designated feature.

(18) The information processing apparatus according to any one of (12) to (17), wherein the data input to the learned model includes a token of the determined context sequence, and the data output by the learned model includes a token of the new target sequence.

(19) The information processing apparatus according to any one of (12) to (18), wherein the data input to the learned model includes a token of the determined context sequence and a predetermined token, and the data output by the learned model includes a token of the new target sequence.

(20) The information processing apparatus according to (18) or (19), wherein a series of information given by the sequence is music information indicating a pitch value of sound for each time, and the token indicates at least one of the pitch value of the sound and a generation period the sound.

(21) An information processing method comprising generating a sequence including a determined context sequence and a new target sequence using input information and a learned model, the input information being information concerning a sequence in which a part is configured by a target sequence and a remainder is configured by a context sequence and that gives a series of information, wherein when data corresponding to the input information is input, the learned model outputs data corresponding to the new target sequence.

(22) An information processing program for causing a computer to execute generating a sequence including a determined context sequence and a new target sequence using input information and a learned model, the input information being information concerning a sequence in which a part is configured by a target sequence and a remainder is configured by a context sequence and that gives a series of information, wherein when data corresponding to the input information is input, the learned model outputs data corresponding to the new target sequence.

REFERENCE SIGNS LIST

1 INFORMATION PROCESSING APPARATUS
10 USER INTERFACE (INPUT MEANS, SELECTING MEANS, DISPLAY MEANS)
20 STORAGE UNIT
21 LEARNED MODEL (MACHINE LEARNING MODEL)
22 INFORMATION PROCESSING PROGRAM
30 GENERATION UNIT (CONTROL UNIT)
211 ENCODER MODEL
212 PLIER MODEL
213 DECODER MODEL
ENC ENCODER
DEC DECODER
U USER

The invention claimed is:

1. An information processing apparatus comprising:

circuitry configured to input original sequence data into a machine learning model that generates new sequence data based on the original sequence data, based on the new sequence data that is generated by the machine learning model, select one of:

target sequence data that maintains and changes the original sequence data, or context sequence data that replaces the original sequence data with a new different sequence data that is based on the original sequence data, and one of:

(i) based on the target sequence data that maintains and changes the original sequence data, generate and output new target sequence data having a new feature inserted between original features of the original sequence data; or (ii) based on the context sequence data that replaces the original sequence data with a new different sequence data based on the original sequence data, generate and output the new different sequence data.

2. The information processing apparatus according to claim 1, wherein the circuitry selects the one of the target sequence data or the context sequence data based on a user input.

3. An information processing apparatus comprising:

circuitry configured to:

input information to a learned model, wherein the information input to the learned model is information concerning an original sequence in which a part is configured by an original target sequence and a remainder is configured by an original context sequence and that provides a series of information, receive, from the learned model, data generated by the learned model that is based on the input information, and based on the data generated by the learned model, generate and output a sequence that includes one of a new context sequence or a new target sequence, wherein the new target sequence changes the original sequence by including a feature between features of the original target sequence, and wherein the new context sequence data replaces the original sequence with a new different sequence that is based on the original sequence.

4. The information processing apparatus according to claim 3, wherein the input information includes information about a position of the original context sequence in the sequence.

5. The information processing apparatus according to claim 3, wherein the one of the new context sequence or the new target sequence comprises the new context sequence.

6. The information processing apparatus according to claim 3, wherein the one of the new context sequence or the new target sequence comprises the new target sequence.

7. The information processing apparatus according to claim 3, wherein the information input to the learned model includes a token of the original context sequence, and the data generated by the learned model includes a token of the new target sequence.

8. The information processing apparatus according to claim 3, wherein the information input to the learned model includes a token of the original context sequence and a predetermined token, and the data generated by the learned model includes a token of the new target sequence.

9. The information processing apparatus according to claim 7, wherein the information input to the learned model includes music information indicating a pitch value of sound for each time, and the token of the original context sequence indicates at least one of the pitch value of the sound or a generation period of the sound.

10. An information processing method performed by an information processing apparatus, the information processing method comprising:

inputting information to a learned model, wherein the information input to the learned model is information concerning an original sequence in which a part is configured by an original target sequence and a remainder is configured by an original context sequence and that provides a series of information, receiving, from the learned model, data generated by the learned model that is based on the input information; and based on the data generated by the learned model, generating and outputting a sequence that includes one of a new context sequence or a new target sequence, wherein the new target sequence changes the original sequence by including a feature between features of the original target sequence, and wherein the new context sequence data replaces the original sequence with a new different sequence that is based on the original sequence.

11. An information processing method performed by an information processing apparatus, the information processing method comprising:

inputting original sequence data into a machine learning model that generates new sequence data based on the original sequence data, based on the new sequence data that is generated by the machine learning model selecting one of:

target sequence data that changes the original sequence data or context sequence data that does not change the original sequence data, and one of:

(i) based on the target sequence data that changes the original sequence data, generating and outputting new target sequence data having a feature between features of target sequence data of at least two sequence data of the original sequence data; or (ii) based on the context sequence data that does not change the original sequence data, generating and outputting new different sequence data based on the original sequence data.

12. A non-transitory computer-readable storage medium storing a program that, when executed by a computer, causes the computer to perform an information processing method comprising:

inputting original sequence data into a machine learning model that generates new sequence data based on the original sequence data, based on the new sequence data that is generated by the machine learning model, selecting one of:

target sequence data that changes the original sequence data or context sequence data that does not change the original sequence data, and one of:

(i) based on the target sequence data that changes the original sequence data generating and outputting new target sequence data having a feature between features of target sequence data of at least two sequence data of the original sequence data; or (ii) based on the context sequence data that does not change the original sequence data, generating and outputting new different sequence data based on the original sequence data.

* * * * *